March 31, 1970    B. STEVENS, JR., ET AL    3,504,250

THREE PHASE ELECTROMECHANICAL DRIVE SYSTEM

Filed Sept. 14, 1967

INVENTORS
BROOKS STEVENS, JR.
DERWIN H. STEVENS
BY
Wolf, Greenfield + Hieken
ATTORNEYS

3,504,250
THREE PHASE ELECTROMECHANICAL DRIVE SYSTEM

Brooks Stevens, Jr., Concord, Mass., and Derwin H. Stevens, Stone Ridge, N.Y., assignors to Riggs & Lombard Incorporated, Lowell, Mass., a corporation of Massachusetts
Filed Sept. 14, 1967, Ser. No. 667,680
Int. Cl. H02k *33/00;* H02p *1/00*
U.S. Cl. 318—128                    9 Claims

ABSTRACT OF THE DISCLOSURE

An electrically driven system, such as a doffer comb, resonant near the fundamental power frequency, is electrically driven by means including a winding that is in series with all three phases of a three-phase power source. Respective silicon controlled rectifiers are in series with the winding and a respective one of the three phases and rendered conductive at times determined by the instantaneous position of the vibrating mechanical member in such a manner that power is supplied in such electrical phase as to develop a corresponding mechanical force that aids the movement of the vibrating member so as to sustain vibrations substantially at the electromechanical resonant frequency of the system, even though this frequency differs slightly from that of the three phase driving power.

BACKGROUND OF THE INVENTION

The present invention relates in general to electromechanical systems and more particularly concerns a novel electromechanical system that may be resonant at a frequency different from that of an electrical driving power source, yet be efficiently driven by that power source.

Vibrating systems, such as a doffer comb, are often designed to vibrate in a resonant mode at approximately 60 Hz., the usual power frequency. Such resonant systems frequently exhibit high Q. Both because of this high Q and the difficulty in building a system that will be resonant at exactly 60 Hz,. driving such a system directly from the power lines is impractical. It has also been found experimentally that switching a D-C supply at high power levels in synchronism with the vibrating doffer comb is difficult and unreliable.

Accordingly, it is an important object of this invention to electrically drive with reasonable efficiency a vibrating electromechanical system characterized by high Q and resonant at a frequency near that of power frequencies.

It is a further object of the invention to achieve the preceding object with apparatus that operates with relatively high reliability.

It is still a further object of the invention to achieve the preceding objects with apparatus that is relatively inexpensive.

SUMMARY OF THE INVENTION

According to the invention, there is a driven member, and driving means responsive to electrical power for displacing the driven member. Transducing means responsive to the position of the driven member provide a positional signal representative of the position of the driven member that is applied to switching control means. A source of three-phase power is coupled to the driving means through phase switching means responsive to the signal provided by the switching control means for coupling energy from the respective phases to the driving means at times related to the position of the driven member so that the mechanical force provided by the driving means occurs in impulses that aid the movement of the driven member. Typically, the driven member is a vibrating element, such as a doffer comb energized by driving winding means that receives energy from a given phase only when a silicon controlled rectifier associated with the respective phase is rendered conductive at the proper time to keep the element oscillating at the system natural frequency.

Numerous other features, objects and advantages of the invention will become apparent from the following specification when read in connection with the accompanying drawing in which:

Detailed description of preferred embodiments

Figure 1:
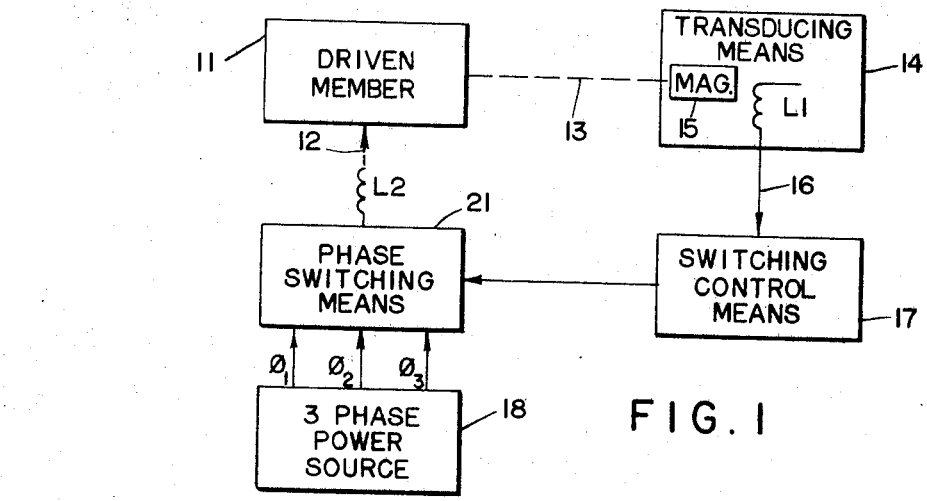
FIG. 1 is a largely block diagram illustrating the logical arrangement of a system according to the invention.

With reference now to the drawing and more particularly FIG. 1 thereof, there is shown a block diagram illustrating the logical arrangement of a system according to the invention. A driven member 11 typically vibrates at an electromechanical system resonant frequency slightly different from 60 Hz., the usual power supply frequency, in response to the mechanical forces applied by the mechanical coupling link 12 from the driving winding L2. Typically the coupling link 12 utilizes the magnetic attraction and repulsion between a magnetic member and the winding L2 in whose near magnetic field the driven member 11 resides. A mechanical link 13 couples an indication of the position of driven member 11 to transducing means 14 to provide a signal on output line 15 representative of the position of driven member 11. The transducing means 14 may comprise a permanent magnet maintained in fixed relationship with respect to driven member 11 that induces a voltage in inductance L1 representative of the instantaneous position of driven member 11. This positional signal is provided on line 16 to cause switching control means 17 to control the instant of switching of the three phases provided by three phase power source 18 effected by phase switching means 21 so as to deliver current impulses to driving coils L2 providing force impulses that aid the contemporary motion of the driven member 11. The preferred approach embodying the invention takes advantage of the characteristics of three phase power where the respective phases are displaced in time by 120 degrees. Since at least one phase (and at the most, two) is positive with respect to ground in the Y connection at any time, the combined outputs of the three phases, when each is rectified, have some of the characteristics of a D-C supply. That is, the output potential is unipolar and always greater than zero, though it fluctuates with time. By using silicon controlled rectifiers that are gated on in predetermined time relationship with the positional signal, this unidirectional power may be applied to the driving coils for the driven member at the proper time to maintain oscillation at the natural frequency of the system.

The system has a number of advantages. No heavy duty D-C power supply is required. The electromechanical system need not be resonant at precisely 60 Hz. Preferably, the electromechanical system is resonant approximately 2 Hz. above or below 60 Hz. Such a choice prevents hunting that might arise from variations in the unipolar pulse amplitude.

Figure 2:
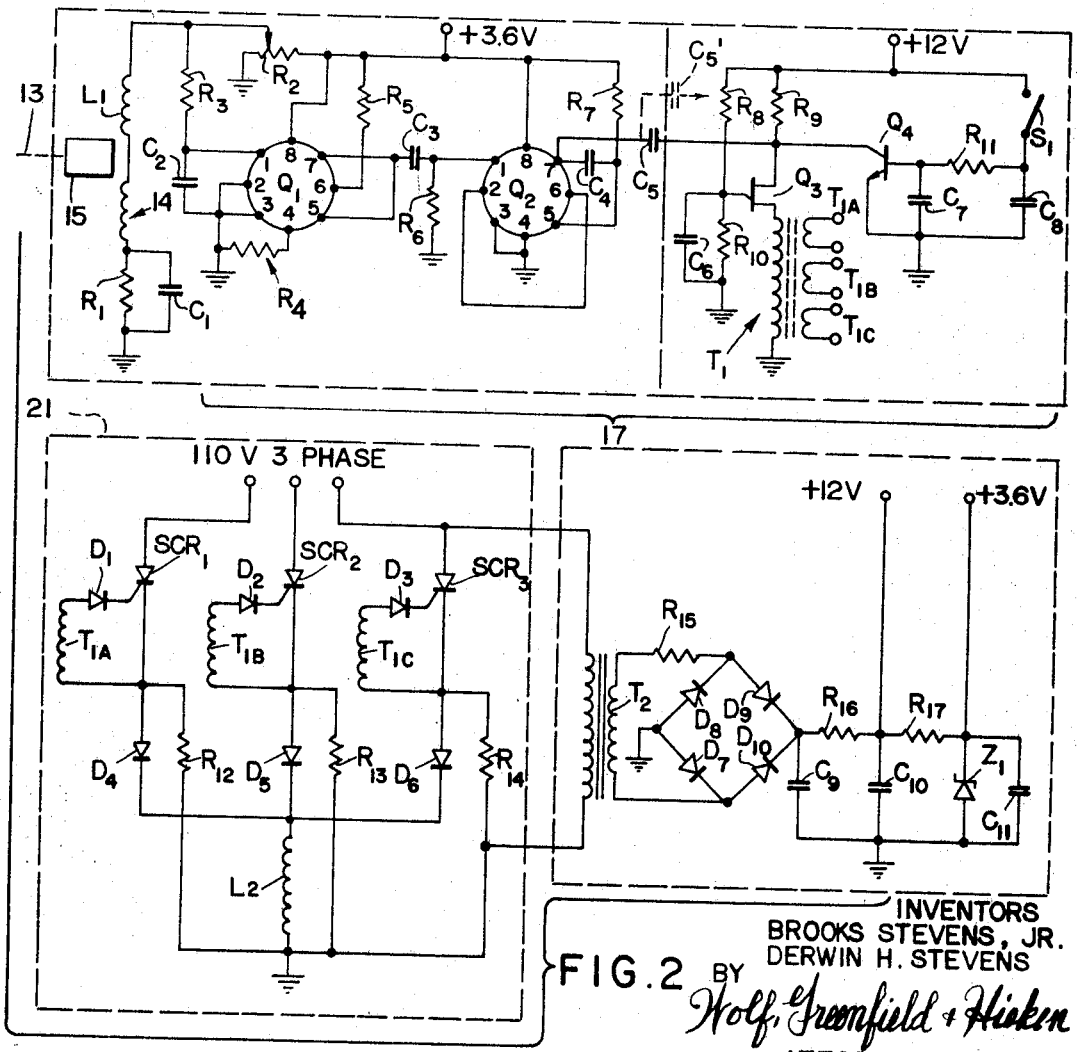
FIG. 2 is a schematic circuit diagram of a preferred embodiment of the invention.

Referring now to FIG. 2, there is a schematic circuit diagram of a preferred embodiment of circuitry embodying the principles of the invention. Where applicable corresponding reference symbols designate corresponding elements in FIGS. 1 and 2. It is convenient to designate resistors, inductors, capacitors, semiconductor amplifying devices, silicon controlled rectifiers, diodes, Zener diodes, switches and transformers by the letters R, L, C, Q, SCR, D, Z, S and T with an appended order symbol as is conveniently done in circuit diagrams.

It is convenient to divide the circuitry into four logical groups, the transducer and signal shaper, the SCR trigger circuit, the SCR switching circuit and the power supply that provides D-C power to the transducer and signal shaper and SCR trigger circuits. The SCR trigger circuit comprises the switching control means 17.

The transducing means 14 preferably comprises inductance L1 composed of two windings mounted on opposite legs of the "U" part of a "U–I" transformer lamination. A permanent magnet is attached to the oscillating shaft of the doffer comb and moves back and forth in front of the two legs of the core as the doffer comb oscillates to induce a voltage in the two windings of inductance L1. These windings are connected so that the voltage induced by the motion of permanent magnet 15 adds while that caused by external fields tends to be cancelled.

This voltage developed across inductance L1 is typically sinusoidal of frequency the same as the doffer comb vibration frequency with instantaneous phase corresponding to the contemporaneous position of permanent magnet 15, and consequently that of the oscillating shaft. Typically this voltage is zero when the oscillating shaft is at one of the extremities of its path of motion.

Integrated circuit Q1 is a Fairchild micrologic circuit with leads interconnected as shown to form a Schmitt trigger circuit that converts the sine wave into a square wave of the same frequency. Resistor R3 and capacitor C2 function as a low pass filter that eliminates any sharp pulses picked up by inductor L1. Resistor R1 coacts with potentiometer R2 to form a voltage divider that allows adjustment of the bias on the input of integrated circuit Q1 for controlling the instant of Schmitt trigger firing. Capacitor C1 bypasses resistor R1 at the signal frequency of approximately 60 Hz.

The bias adjustment effected by potentiometer R2 controls the phase of the power delivered to the doffer comb so that the greatest efficiency can be achieved. The transducing means 14 has the characteristic of delivering zero output when the doffer comb is at one extremity of its path of motion. If the Schmitt trigger were adjusted to fire at this zero crossing, the power to the driving coils L2 would actually be delivered too late because a finite time is required for the current to build up in these coils. Potentiometer R2 allows the firing of the Schmitt trigger to occur when the output voltage provided by inductor L1 is either above or below the zero crossing.

The output of integrated circuit Q1 is coupled through an RC network formed by resistor R6 and capacitor C3 functioning as a differentiator network to provide sharp, steep negative and positive pulses. The positive pulses applied to pin 1 of integrated circuit Q2 connected as a monostable multivibrator establish the astable state for a duration determined primarily by the time constant of the RC network formed by resistor R7 and capacitor C4. Pin 7 of integrated circuit Q2 provides a negative-going pulse that is coupled through capacitor C5 when the monostable multivibrator is switched into its astable state.

The function of this negative-going pulse will be better understood after first considering the SCR trigger circuit to which this pulse is applied. Double-based diode, or unijunction transistor Q3 and its associated circuitry forms a controlled oscillator. The voltage divider formed by resistors R8 and R10 establish a potential to which capacitor C6 may charge that is below the ignition potential of transistor Q3. This potential at the emitter of unijunction transistor Q3 is typically thus limited to about six volts, a potential insufficient to render transistor Q3 conductive. Therefore, the untriggered circuit does not oscillate.

When a negative pulse is coupled through capacitor C5 to the upper base of transistor Q3, the voltage at the upper base is momentarily diminished, thereby rendering unijunction transistor Q3 conductive to initiate the discharge of capacitor C6 through the lower base-emitter junction of transistor Q3 and the primary of transformer T1. Resistor R9 establishes a biasing potential on the upper base of transistor Q3 such that the negative pulse coupled through capacitor C5 may render unijunction transistor Q3 conductive. The discharge continues until the potential across capacitor C6 is such as to render unijunction transistor Q3 nonconductive. Condenser C6 then is recharged sufficiently rapidly so that the next negative-going pulse coupled through capacitor C5 may trigger unijunction transistor Q3. During the conducting interval, current pulses are available at secondary windings T1A, T1B and T1C for gating silicon controlled rectifiers SCR1, SCR2 and SCR3 associated with phases 1, 2 and 3, respectively, provided by the source 18.

Switch S1, NPN transistor Q4, capacitors C7 and C8 and resistor R11 comprise a starting circuit to initiate doffer comb vibration. This circuit functions to convert the unijunction circuit from a normally triggered relaxation oscillator to a free-running oscillator temporarily and to slowly sweep the frequency of this temporarily free-running oscillator through the range of frequencies embracing the natural frequency of the electromechanical system. This is accomplished by lowering the voltage on the upper base of unijunction transistor Q3 so that transistor Q3 may conduct with the six volts established on the emitter by the voltage dividing action of resistors R8 and R10.

When switch S1 is momentarily closed, capacitor C8 charges to +12 volts, and current is supplied to the base of NPN transistor Q4 to render that transistor conductive, thereby lowering the voltage at the junction of resistor R9 and the upper base of transistor Q3. The circuit comprising transistor Q3 then oscillates freely. The value of resistor R11 is such that with +12 volts on capacitor C8, transistor Q4 draws sufficient current to allow the circuit comprising transistor Q3 to oscillate at a frequency slightly higher than the expected natural frequency of the electromechanical system. However, as capacitor C8 discharges after switch S1 is opened, the current available to the base of transistor Q4 decreases, causing a corresponding decrease in the collector current of transistor Q4 and increase in the voltage on the upper base of transistor Q3. This rise in voltage causes the frequency of oscillation of the relaxation of oscillator to decrease and, if no signal is received through capacitor C5, to finally cease oscillation. However, by making the sweeping action of the circuitry associated with transistor Q4 slow enough and making the frequency of oscillation of transistor Q3 pass through the resonant frequency of the electromechanical system, the signal shaper circuit will receive a transduced signal as the comb begins to vibrate and provide negative pulses coupled through capacitor C5. These pulses will lock the relaxation oscillator circuit into normal operation at the resonant frequency of the electromechanical system, thereby establishing normal oscillation of this system. This normal operation will continue even though transistor Q4 may still be partially conducting. Eventually, as capacitor C8 discharges, transistor Q4 stops conducting and is effectively out of the base circuit of transistor Q3. Capacitor C7 is included to provide additional low-pass filtering.

The novel starting circuit makes use of the circuitry according to the invention practical for use with any doffer comb manufactured to practical tolerances where precise control of the self-resonant frequency of each electromechanical system incorporating a comb is difficult to achieve. By sweeping the relaxation oscillation in the manner described above, it is immaterial what the resonant frequency of a particular electromechanical system is so long as it is within the range swept by the circuit. Since doffer combs can be manufactured to operate in systems within several Hz. of a nominal design resonant frequency, the preferred approach according to the invention reduces costs by allowing one standard circuit to be used with all combs.

It was stated above that transformer T1 has three separate secondaries, one for triggering each of the SCR's associated with a respective phase. All three SCR's are triggered simultaneously for conduction, but only the forward-biased one or two at the instant of triggering actually conduct. Because of the 120 degree phase displacement among the three phases, at least one SCR will always conduct, with the possibility that two may conduct. By using a Y connection, the three SCR's are connected in series with a respective diode D4, D5 and D6 to the common load, inductor L2, the driving winding on the doffer comb.

Diodes D1, D2 and D3 are in series with secondary windings T1A, T1B and T1C, respectively, and a gate electrode of SCR1, SCR2 and SCR3 for preventing a negative trigger pulse from appearing at an SCR gate electrode. Diodes D4, D5 and D6 serve two purposes. They reduce the reverse-voltage rating requirements on the SCR's and they effectively disconnect resistors R12, R13 and R14, respectively, from the common load. Resistors R12, R13 and R14 hold an associated one of the SCR's in the conducting region until the current through drive winding L2 has become established. Without these resistors, a much longer trigger pulse from transformer T1 would be required to lock the SCR's on.

The power supply comprises a conventional bridge rectifier circuit receiving A-C power from the secondary winding of transformer T2 energized by one of the three phases with an RC filter and regulation of the +3.6 potential by Zener diode Z1.

The specific circuit shown and described operates a single-ended doffer comb. For a long double-ended comb, only the SCR trigger circuit and the SCR switching circuit need be duplicated. The second SCR trigger circuit may receive negative pulses from the signal shaper through an additional capacitor C5, shown in dotted lines in FIG. 2. However, the second SCR trigger circuit would not require a separate starting circuit. Thus, for production purposes it is preferred that the starting circuit comprising transistor Q4 and associated components be incorporated into the signal shaper circuit board so that it is unnecessary to construct two different SCR trigger circuits, one with a starter circuit and one without when the invention comprises a double-ended comb. It is thus advantageous to build four printed circuit boards: (1) the signal conditioner and starting circuit, (2) the SCR trigger circuit, (3) the SCR switching circuit and (4) the power supply. A single-ended comb system would include one of each of these circuit boards while the double-ended comb system would only need each of the four basic circuit boards plus an additional SCR trigger circuit board and SCR switching circuit board.

There has been described an electromechanical resonant system advantageously driven from a three-phase power source of basic frequency different from that of the electromechanical system resonant frequency in an efficient manner with high reliability capable of driving systems with different resonant frequencies made on a production basis. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Electromechanical apparatus comprising,
   driven member means,
   driving means responsive to electrical power for displacing said driven member means,
   transducing means responsive to the position of said driven member means for providing a positional signal representative of the position of said driven member means,
   a source of three-phase electrical power, and
   phase switching means responsive to said positional signal for coupling energy from the respective phases to said driving means at times related to the position of said driven member means so that the mechanical force provided by said driving means upon said driven member means occurs in impulses that aid the movement of said driven member means,
   said phase switching means including circuit means initially oscillatory at a free running frequency above the resonant frequency of said electromechanical apparatus,
   means for slowly sweeping said free running frequency through the range of frequencies embracing said resonant frequency, and
   means responsive to signals derived from said positional signal for establishing said circuit means oscillatory substantially at said resonant frequency.

2. Electromechanical apparatus in accordance with claim 1 wherein said phase switching means comprises three silicon controlled rectifiers each associated with a respective one of the three phases, and
   means for coupling said positional signal to said silicon controlled rectifiers to condition each for conduction only during time intervals in which the electrical energy delivered by a then conducting one of said rectifiers to said driving means is converted by the latter into a force impulse that aids the movement of said driven member means.

3. Electromechanical apparatus in accordance with claim 2 wherein said driven member means comprises a vibratable element, and
   said driving means comprises driving winding means that receives energy from a respective phase only when the silicon controlled rectifier associated with that phase is both conditioned for conduction in response to said positional signal and the contemporary polarity of that phase across that rectifier biases the latter in the forward direction.

4. Electromechanical apparatus in accordance with claim 3 and further comprising means including said silicon controlled rectifiers for coupling each of said phases across said driving winding means in parallel and means responsive to said positional signal for conditioning substantially simultaneously all of said silicon controlled rectifiers for conduction.

5. Electromechanical apparatus in accordance with claim 1 and further comprising means including said driven member means for establishing a resonant frequency of said electromechanical apparatus that is near but different from the frequency of said three-phase electrical power.

6. Electromechanical apparatus in accordance with claim 4 and further comprising means including said driven member means for establishing a resonant frequency of said electromechanical apparatus that is near but different from the frequency of said three-phase electrical power.

7. Electromechanical apparatus in accordance with claim 6 wherein said transducing means comprises permanent magnetic means secured to said vibratable element magnetically coupled to a magnetic structure having first and second legs with first and second windings respectively thereon connected in series to provide said positional signal across the series combination of said first and second windings, and
   further comprising means responsive to said positional signal for conditioning said silicon controlled rectifiers for conduction at times when said positional signal has a value different from zero.

8. Electromechanical apparatus in accordance with claim 1 wherein said circuit means comprises a first capacitor and means including a semiconductor device for controlling the charge and discharge of said first capacitor to establish the circuit oscillatory frequency, and said means for slowly sweeping comprises,
a second semiconductor device coupled to said first semiconductor device for coacting therewith to control the period of charge and discharge of said first capacitor in accordance with the potential across a second capacitor, and
means for initially establishing a predetermined potential across said second capacitor that initially establishes said period shorter than a resonant period of said resonant frequency, and
means for altering the potential across said second capacitor to thereby lengthen said period until it corresponds substantially to said resonant period.

9. Electromechanical apparatus in accordance with claim 8 wherein said first semiconductor device is a unijunction transistor with its emitter connected to said first capacitor,
said second semiconductor device is a transistor with its collector connected to one base of said unijunction transistor and with its base connected to said second capacitor,
said means for initially establishing includes a switch for charging said second capacitor to a first potential that renders said transistor conductive, and
said means for altering comprises a discharge circuit connected across said second capacitor for discharging said second capacitor to a potential that renders said transistor nonconductive.

References Cited

UNITED STATES PATENTS

| | | | |
|---|---|---|---|
| 3,114,098 | 12/1963 | Rallo et al. | 321—18 |
| 3,122,690 | 2/1964 | Dion et al. | 318—128 |
| 3,129,368 | 4/1964 | Burnett | 318—227 |
| 3,154,695 | 10/1964 | MacGregor et al. | 307—88.5 |
| 3,189,810 | 6/1965 | MacGregor | 318—227 |
| 3,218,793 | 11/1965 | Walton | 331—116 X |
| 3,293,520 | 12/1966 | Lehry | 307—252 X |
| 3,304,486 | 2/1967 | Michaels | 323—22 X |

MILTON O. HIRSHFIELD, Primary Examiner

D. F. DUGGAN, Assistant Examiner

U.S. Cl. X.R.

318—132, 227